July 18, 1967     H. G. VORE     3,331,512

FILTER SCREEN

Filed June 1, 1965     3 Sheets-Sheet 1

INVENTOR.
HERBERT G. VORE
BY
Daniel W. Tillott
ATTORNEY

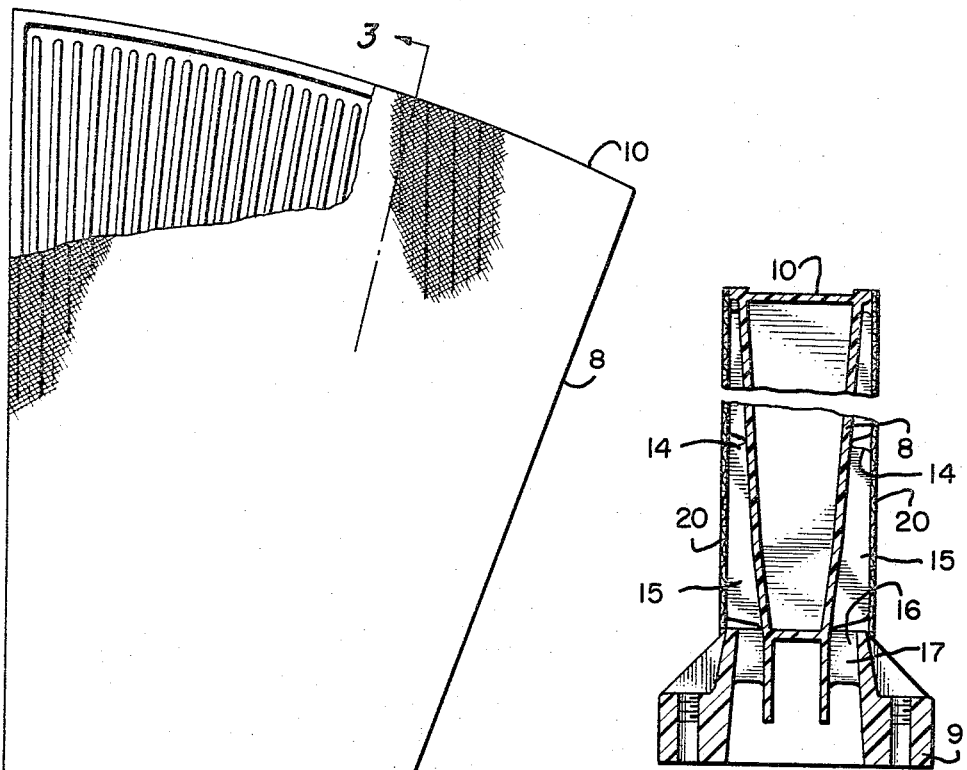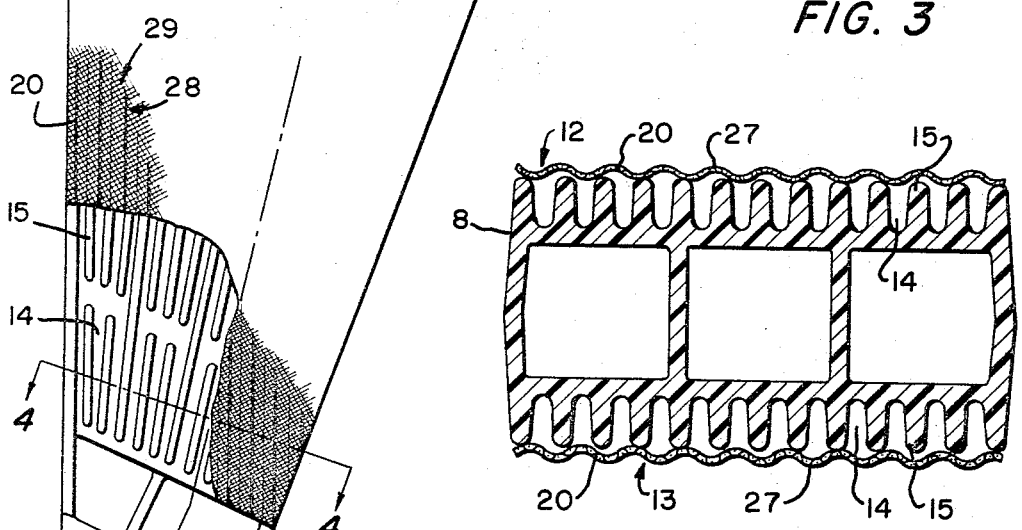

ated July 18, 1967

3,331,512
FILTER SCREEN
Herbert G. Vore, Nashua, N.H., assignor to Improved Machinery, Inc., Nashua, N.H., a corporation of Delaware
Filed June 1, 1965, Ser. No. 460,125
3 Claims. (Cl. 210—487)

The present invention relates to improvements in continuous filters, such as continuous disc filters composed of a filter base covered with a metal screen.

The invention is herein disclosed as embodied in a disc filter of the general type comprising a disc filter assembly rotatably supported in a position partly submerged in a slurry bath and including a core rotating on a horizontal axis and a plurality of sectioned disc filters mounted along said core in axially spaced relationship. Each filter section comprises two oppositely facing suction surfaces covered by filter screens. A filter layer or cake is deposited on the screens by a suction applied to the interior of the filter section while it is passing through the slurry bath and this deposited layer is subsequently stripped from the screens after the filter section emerges from the bath, during continued rotation of the filter disc assembly.

A disc filter of the foregoing type is disclosed in the U.S. patent application, Ser. No. 87,158, filed by Neil F. Putnam on Feb. 6, 1961, which is now Patent No. 3,193,105.

A preferred embodiment of a disc filter contains disc filter sections having a substantially sector shape and made from a plastic material, such as polypropylene, which is molded and is so constructed and arranged as to provide a structure of maximum strength and utility. In the disc filter art, these sections are known as "leaves." Each disc section or leaf comprises a base including a root and a pair of wedge-shaped filter section faces extending outwardly from the root and spaced from one another on said base. The outer faces of said filter section leaves are formed as suction areas, and are in substantially parallel relation. Reinforcing walls are provided, disposed in planes radiating from the root, to form a rigid filter section leaf or base. Metal screens are fastened over each face of a filter leaf, usually by heat sealing the screen along its borders to the underlying plastic material of the leaf.

Heretofore, the thermal expansion coefficient of the plastic material forming the leaf has been substantially greater than the coefficient of the metal screen so that thermal expansion of the plastic leaf, caused by its use at normal elevated operating temperatures, results in deforming portions of the plastic leaf. As a result of such deformation of the plastic leaf, the screen tends to assume a "baggy" appearance when the plastic leaf cools. Some operators of disc filters find such "baggy" appearance objectionable. Furthermore, deformation of the plastic leaf may be objectionable for other reasons than merely the "baggy" appearance of the screen.

The principal object of this invention is to eliminate or substantially minimize the above problem with prior art filter screens.

Other important objects of this invention are: to provide a woven filter screen which can stretch with a plastic disc filter leaf or other filter base without developing sufficient tension or tensile stress to deform the filter base; and to provide a woven filter screen which can stretch substantiallly in all directions without causing deformation of its underlying filter base or otherwise developing unduly high tensile stresses.

The foregoing objects are attained generally by corrugating the filter screen prior to attaching it over a filter base or disc filter leaf. Preferably, the corrugations or folds are arranged to extend at acute angles to both the horizontal and vertical wires (warp and woof wires) in the screen so that the screen is able to stretch in all directions without causing deformation of the filter base or otherwise developing unduly high tensile stresses.

This invention is described in connection with the accompanying drawings wherein:

FIG. 2 is a plan or face view of a disc filter leaf utilizing a filter screen taught by this invention;

FIG. 3 is a section taken on line 3—3 of FIG. 2;

FIG. 4 is a section taken on line 4—4 of FIG. 2; and

Figure 1:
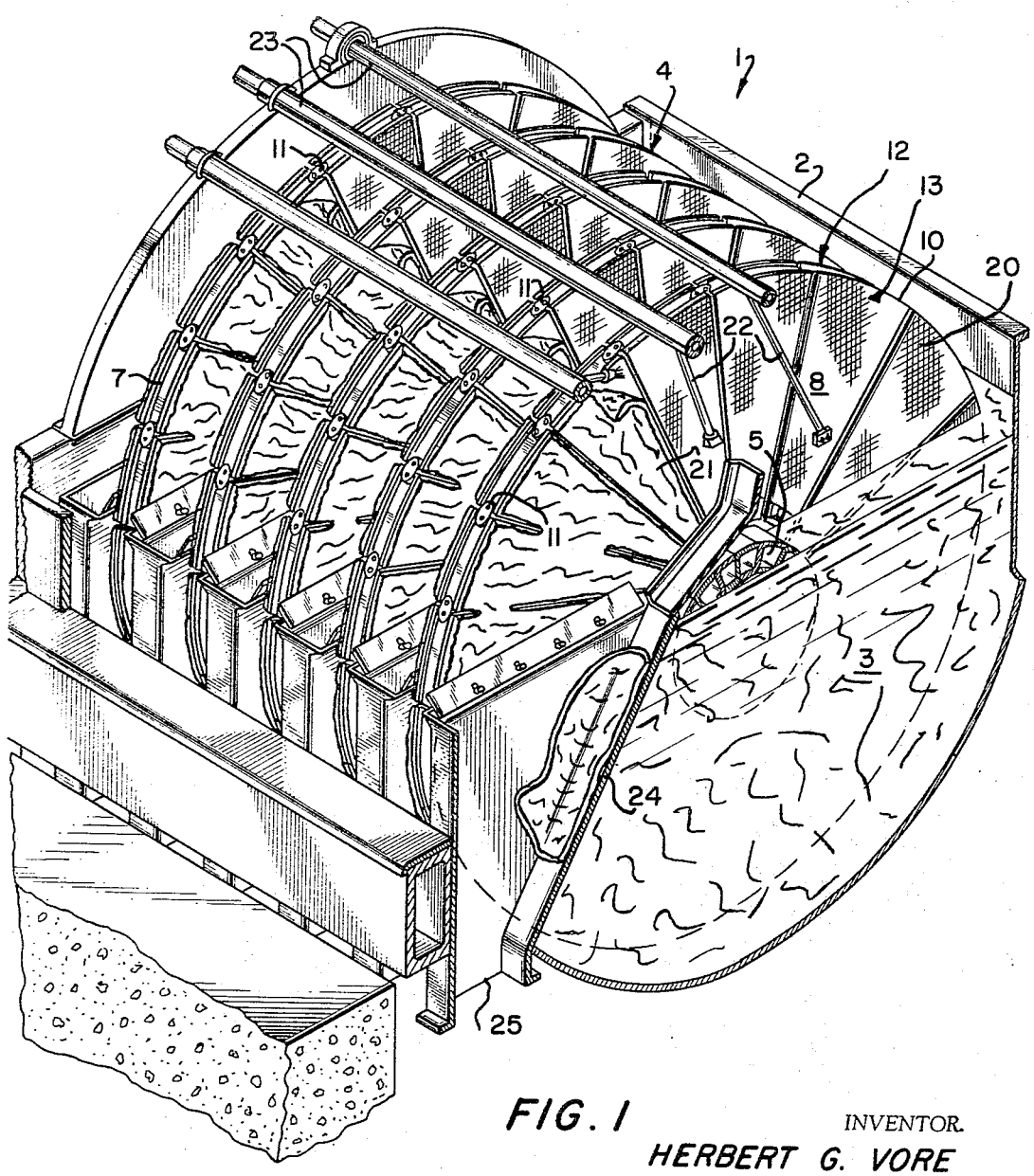
FIG. 1 is a perspective view with portions being cut away of a disc filter.

The disc filter 1 shown in FIG. 1 generally comprises a vat 2 containing a slurry 3 and a rotary disc filter assembly 4 mounted for rotation partly immersed in the slurry 3. The filter assembly includes a hollow axial core 5 mounted for rotation in bearings (not shown) located at each end of the vat 2. The core 5 is rotatively driven by a drive means hidden from view in FIG. 1. In addition, the interior of the core 5 is connected to a vacuum source (not shown) for applying a suction to the interior of the core 5.

A series of sectional filter discs 7 are mounted in axially spaced relationship on the core 5 to rotate with the core with the lower half of each disc 7 immersed in the slurry 3. Each disc 7 is formed of a plurality of substantially sector-shaped sections or leaves 8 having their inner ends or roots 9 bolted to the core 5 and their outer ends 10 attached together by straps 11 to form the periphery of the disc 7.

The opposite faces 12 and 13 of each leaf contains a series of radial grooves 14 separated by radial ridges 15. The grooves 14 extend radially inward to ports 16 formed in each leaf 8 near its root 9. The ports 16 open into a hollow passage 17 provided in the leaf 8 communicating with openings 18 in the core 5. Thus the ports 16, passages 17 and openings 18 serve as a means for connecting the vacuum pressure in the core 5 to the grooves 14 provided in each of the faces 12 and 13 of each leaf 8. Each of faces 12 and 13 is covered with a woven wire screen 20 attached to the leaf 8 to serve as a surface on which fibers or other solids in the slurry 3 are deposited or accreted during the operation of the drum filter.

As the filter discs 7 rotate, the vacuum pressure in the grooves 14 beneath the screens 20 suck water or other filtrate through the screens 20 during the time that a disc leaf 8 is immersed in the slurry 3, thus separating the filtrate from fibers or other solids and causing the solids to build up as a "cake" 21 on the screens 20. After the screens 20 and cake 21 emerge from the slurry 3, jet sprays from sprayers 22, fed from pipes 23, peel the cake 21 from the screens 20, as illustrated in FIG. 1. The peeled portions of the cake 21 are termed "stock." The stock drops into chutes 24 mounted adjacent to the disc faces and is conveyed through the chutes 24 to stock discharge outlets 25. All of the foregoing structure is disclosed in the aforementioned U.S. patent application, Ser. No. 87,158, filed on Feb. 6, 1961, by Neil F. Putnam.

In an example of the foregoing disc filter, each leaf 8 is made of molded plastic, such as polypropylene. The screens 20 are stretched over and attached to the opposite faces 12 and 13 of the leaf by a heat sealing operation. The screens 20 are made of intermeshed woven stainless steel wire. The plastic material used to make the leaves 8 has a much greater thermal expansion coefficient than the stainless steel wires. As a result, using the disc filter at elevated temperatures, which is normal, causes the leaves 8 to expand sufficiently to develop enough tension in the screens 20 to deform portions of the leaves 8. Thereafter, when the filter leaves 8 cooled, the screens 20 are loose and have a "baggy" appearance which is objectionable. Furthermore, deformation of the filter leaves may be undesirable for other reasons, depending on the character of the deformation.

Figure 5:
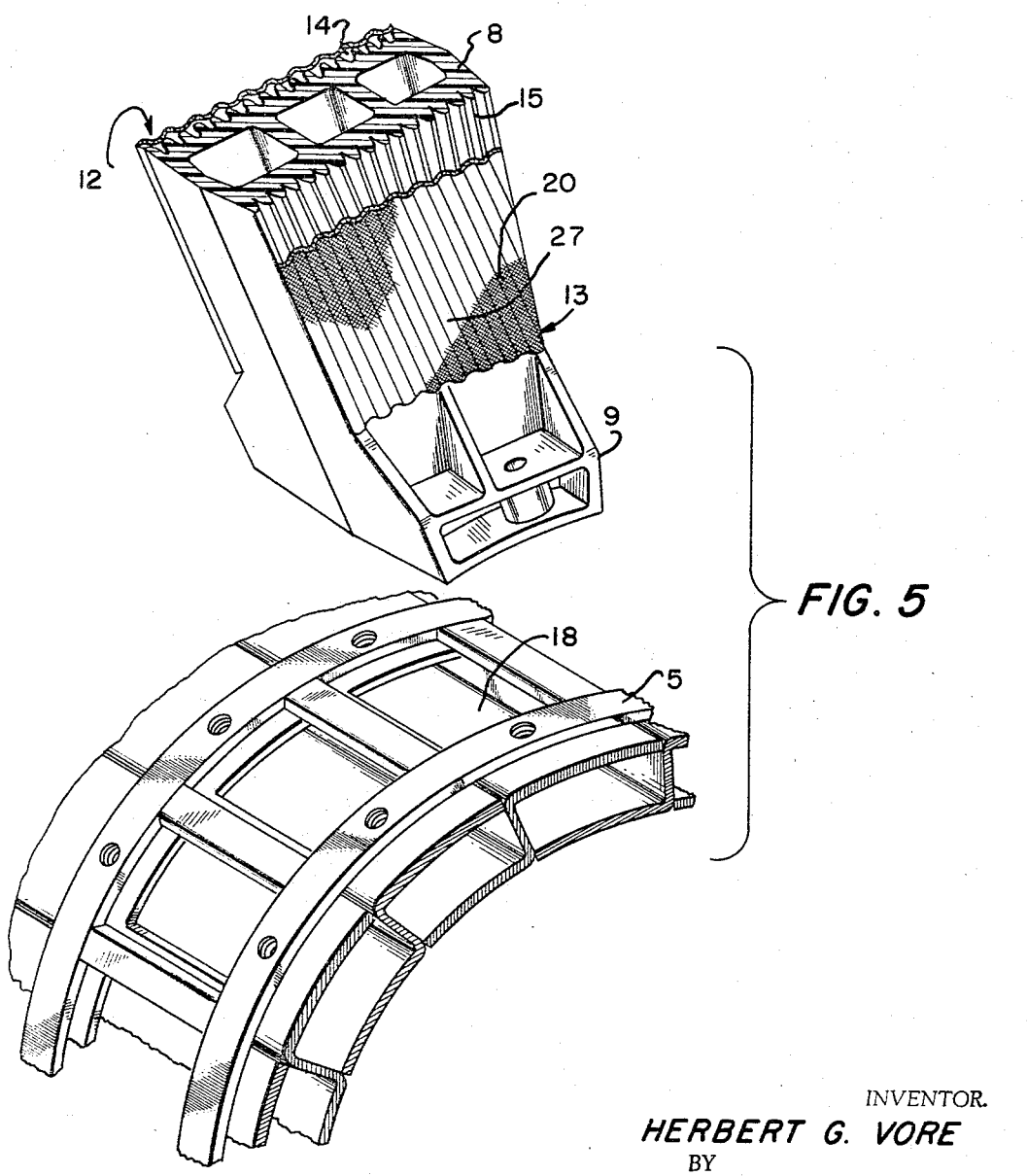
FIG. 5 is a fragmentary, exploded and perspective view illustrating the attachment of a filter leaf on the core of the disc filter.

This invention solves this problem by corrugating the screen 20 with parallel corrugations or folds 27 prior to attaching it to a disc leaf 8, thus providing the screen 20 with sufficient resiliency to stretch with the thermal expansion of the leaf 8 without developing sufficient tension to deform the leaf 8. FIGS. 4 and 5 illustrate the parallel corrugations or folds 27 in the screen 20. Preferably, the corrugations or folds 27 extend at acute angles to both the warp wires 28 and the woof wires 29 in the screen 20 so that the screen 20 has a "two-way stretch," thus having the ability to stretch in all directions without being drawn beyond its elastic limit. In addition, the corrugations 27 should run in a direction which does not interfere with the removal or peeling of the cake 21 from the screen 20.

In an example screen 20 made and tested in accordance with this invention, a forty mesh screen was used, composed of stainless steel wire having a diameter of about .005 inch. This screen was provided with a series of parallel and evenly spaced corrugations 27 having a spacing of about five to the inch. These corrugations had a height of about $\frac{1}{16}$ to $\frac{1}{8}$ inch. Such corrugations can be formed using a series of dies or corrugating rolls. This screen 20 was mounted on a disc filter leaf 8 made of polypropylene by heat sealing the edges of the screen to the border of the leaf face 12 or 13. No difficulty was experienced in heat sealing the corrugated screen to the filter leaf face. It was found that the foregoing example screen did not deform the leaf 8 during operation, even under the most severe operating conditions.

Although a preferred embodiment of this invention is illustrated and described in detail, it will be understood that this invention is not limited simply to this embodiment, but contemplates other embodiments and variations which utilize the concepts and teachings of this invention.

Having described my invention, I claim:
1. A filter comprising:
   a filter base having a filter face adapted to support a filter screen and at least one passage for conveying fluid from said filter face; and
   a woven filter screen formed from intermeshed wires covering said filter face and outlining openings therebetween, said screen being secured along its edges to said filter base;
   said screen containing a plurality of parallel corrugations, the width of each of said corrugations extending over a plurality of said openings, said corrugations allowing said screen to expand and contract with the expansion and contraction of said filter base to prevent the screen from developing unduly high tensile stresses.
2. The filter of claim 1 wherein:
   the corrugations extend at angles to the wires forming said screen so that said screen can expand and contract in all directions.
3. The filter of claim 1 wherein:
   said filter base is composed of a plastic material having a higher coefficient of thermal expansion than said screen.

References Cited
UNITED STATES PATENTS

| 3,193,105 | 7/1965 | Putnam | 210—332 X |

FOREIGN PATENTS

| 1,051,811 | 3/1959 | Germany. |
| 1,148,976 | 5/1963 | Germany. |

REUBEN FRIEDMAN, *Primary Examiner.*

D. M. RIESS, *Assistant Examiner.*